(12) United States Patent
Messinger et al.

(10) Patent No.: US 10,546,253 B2
(45) Date of Patent: Jan. 28, 2020

(54) REALTIME INSPECTION MANAGEMENT

(71) Applicant: General Electric Company, Schenectady, NY (US)

(72) Inventors: Jason Howard Messinger, Andover, MA (US); Robert Carroll Ward, Essex, CT (US); Michael Christopher Domke, Skaneateles, NY (US); Sekhar Soorianarayanan, Bangalore (IN); Scott Leo Sbihli, Lexington, KY (US); Thomas Eldred Lambdin, Auburn, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1041 days.

(21) Appl. No.: 13/747,443

(22) Filed: Jan. 22, 2013

(65) Prior Publication Data

US 2014/0207417 A1    Jul. 24, 2014

(51) Int. Cl.
*G06Q 10/06*    (2012.01)

(52) U.S. Cl.
CPC ............................. *G06Q 10/06311* (2013.01)

(58) Field of Classification Search
CPC .................... G06Q 10/20; G06Q 10/06311
See application file for complete search history.

(56) References Cited

U.S. PATENT DOCUMENTS

| 6,317,039 | B1 | 11/2001 | Thomason |
| 6,830,545 | B2 | 12/2004 | Bendall |
| 8,059,882 | B2 | 11/2011 | Amidi |
| 8,108,168 | B2 | 1/2012 | Sharp et al. |
| 8,255,170 | B2 | 8/2012 | Kollgaard et al. |
| 2001/0034585 | A1 | 10/2001 | Corby et al. |
| 2002/0198997 | A1 | 12/2002 | Linthicum et al. |
| 2004/0262387 | A1* | 12/2004 | Hart ................. G06Q 10/06 235/384 |
| 2006/0074592 | A1* | 4/2006 | Dobell ................. G07C 1/20 702/182 |
| 2006/0235611 | A1 | 10/2006 | Deaton et al. |

(Continued)

FOREIGN PATENT DOCUMENTS

| CN | 102057403 A | 5/2011 |
| EP | 2192538 A2 | 6/2010 |

(Continued)

OTHER PUBLICATIONS

U.S. Appl. No. 13/747,435, filed Jan. 22, 2013, Jason Howard Messinger.

(Continued)

*Primary Examiner* — Alexander Satanovsky
(74) *Attorney, Agent, or Firm* — Christopher R. Carroll; The Small Patent Law Group, LLC

(57) ABSTRACT

An inspection management system is provided. The inspection management system includes an inspection data provider that receives inspection data relating to an inspector, one or more devices used to complete an inspection, one or more assets associated with an inspection, an inspection plan, etc. A display of the inspection management system presents one or more graphical user interfaces based upon the inspection data. The graphical user interfaces may facilitate inspection planning, execution, preparation, and/or real-time inspection monitoring.

15 Claims, 10 Drawing Sheets

(56) References Cited

U.S. PATENT DOCUMENTS

| | | | |
|---|---|---|---|
| 2007/0002133 A1 | 1/2007 | Metala et al. | |
| 2007/0226258 A1* | 9/2007 | Lambdin | G02B 23/2469 |
| 2009/0210793 A1* | 8/2009 | Yee | G06F 17/30265 |
| | | | 715/723 |
| 2009/0234690 A1* | 9/2009 | Nikipelo | 705/7 |
| 2011/0050881 A1* | 3/2011 | Terayoko | 348/92 |
| 2011/0142059 A1* | 6/2011 | Bedingfield, Sr. | |
| | | | H04L 12/2818 |
| | | | 370/401 |
| 2012/0023435 A1* | 1/2012 | Kneppers et al. | 715/780 |
| 2012/0258739 A1* | 10/2012 | Wetzel et al. | 455/456.3 |

FOREIGN PATENT DOCUMENTS

| | | |
|---|---|---|
| GB | 2449754 A | 12/2008 |
| JP | H11-249731 A | 9/1999 |
| JP | 2004-318553 A | 11/2004 |
| JP | 2006-227463 A | 8/2006 |
| JP | 2010-239731 A | 10/2010 |
| JP | 2011-008764 A | 1/2011 |
| WO | 03/077073 A2 | 9/2003 |

OTHER PUBLICATIONS

U.S. Appl. No. 13/747,438, filed Jan. 22, 2013, Jason Howard Messinger.
U.S. Appl. No. 13/747,457, filed Jan. 22, 2013, Jason Howard Messinger.
U.S. Appl. No. 13/747,453, filed Jan. 22, 2013, Sekhar Soorianarayanan.
U.S. Appl. No. 13/747,429, filed Jan. 22, 2013, Sekhar Soorianarayanan.
U.S. Appl. No. 13/747,464, filed Jan. 22, 2013, Sekhar Soorianarayanan.
U.S. Appl. No. 13/747,456, filed Jan. 22, 2013, Michael Christopher Domke.
U.S. Appl. No. 13/747,449, filed Jan. 22, 2013, Michael Christopher Domke.
U.S. Appl. No. 13/747,416, filed Jan. 22, 2013, Michael Christopher Domke.
U.S. Appl. No. 13/747,408, filed Jan. 22, 2013, Michael Christopher Domke.
U.S. Appl. No. 13/800,015, filed Mar. 13, 2013, Kevin Andrew Coombs.
U.S. Appl. No. 13/732,238, filed Dec. 31, 2012, Michael Christopher Domke.
U.S. Appl. No. 13/732,252, filed Dec. 31, 2012, Kevin Andrew Coombs.
U.S. Appl. No. 13/732,261, filed Dec. 31, 2012, Eugene Schiefer.
U.S. Appl. No. 13/732,281, filed Dec. 31, 2012, Jason Howard Messinger.
U.S. Appl. No. 13/732,293, filed Dec. 31, 2012, Jason Howard Messinger.
U.S. Appl. No. 13/732,303, filed Dec. 31, 2012, Thomas Eldred Lambdin.
U.S. Appl. No. 13/732,268, filed Dec. 31, 2012, Scott Leo Sbihli.
U.S. Appl. No. 13/732,309, filed Dec. 31, 2012, Jason Howard Messinger.
U.S. Appl. No. 13/732,272, filed Dec. 31, 2012, Jason Howard Messinger.
U.S. Appl. No. 13/732,319, filed Dec. 31, 2012, Michael Christopher Domke.
U.S. Appl. No. 13/732,327, filed Dec. 31, 2012, Michael Christopher Domke.
International Search Report and Written Opinion issued in connection with corresponding PCT Application No. PCT/US13/75634 dated Dec. 9, 2014.
Sorrel, Charlie. iControlPad Ships at Last [online], [retrieved on Mar. 21, 2013]. Retrieved from the Internet <URL: http://www.wired.com/gadgetlab/2011/11/icontrolpad-ships-at-last/>.
OmniScan MX [online]. Page 5. Olympus, 2010 [retrieved on Mar. 28, 2013]. Retrieved from the Internet: <URL: www.olympus-ims.com/en/omniscan-mx/>.
Georgeson, Gary. [online], [retrieved on Mar. 28, 2013]. http://www.meetingdata.utcdayton.com/agenda/airworthiness/2012/proceedings/presentations/P5526.pdf.
Phasor XS User's Manual [online]. General Electric: Measurement & Control Solutions. [retrieved on Mar. 28, 2013]. Retrieved from the Internet: <URL: www.ge-mcs.com/download/ultrasound/portable-flaw-detectors/Phasor%20Series/om-phasor-en_rev10.pdf>.
USM Vision 1.2—A Total Weld Inspection Solution to Increase Productivity in New Process Pipework Fabrication [online]. General Electric: Measurement & Control. [retrieved on Mar. 28, 2013]. Retrieved from the Internet: <URL: www. ge-mcs.com/download/ultrasound/portable-flaw-detectors/usm-vision/GEIT-USMVision-20058EN_LR.pdf>.
European Search Report for Application No. EP13819121, dated Jun. 30, 2016.
First Office Action and Search issued in connection with corresponding CN Application No. 201380074987.5 dated Sep. 12, 2017.
Machine Translation and Notification of Reasons for Refusal issued in connection with corresponding JP Application No. 2015-553733 dated Nov. 28, 2017.

\* cited by examiner

REALTIME INSPECTION MANAGEMENT

BACKGROUND

The subject matter disclosed herein relates to inspection management. More specifically, the subject matter disclosed herein relates to providing real-time inspection information via one or more graphical user interfaces.

Certain equipment and facilities, such as power generation equipment and facilities, oil and gas equipment and facilities, aircraft equipment and facilities, manufacturing equipment and facilities, and the like, include a plurality of interrelated systems, and processes. For example, power generation plants may include turbine systems and processes for operating and maintaining the turbine systems. Likewise, oil and gas operations may include carbonaceous fuel retrieval systems and processing equipment interconnected via pipelines. Similarly, aircraft systems may include airplanes and maintenance hangars useful in maintaining airworthiness and providing for maintenance support. During equipment operations, the equipment may degrade, encounter undesired conditions such as corrosion, wear and tear, and so on, potentially affecting overall equipment effectiveness. Certain inspection techniques, such as non-destructive inspection techniques or non-destructive testing (NDT) techniques, may be used to detect undesired equipment conditions.

In a conventional NDT system, data may be shared with other NDT operators or personnel using portable memory devices, paper, of through the telephone. As such, the amount of time to share data between NDT personnel may depend largely on the speed at which the physical portable memory device is physically dispatched to its target. Accordingly, it would be beneficial to improve the data sharing capabilities of the NDT system, for example, to more efficiently test and inspect a variety of systems and equipment. NDT relates to the examination of an object, material, or system without reducing future usefulness. In particular NDT inspections may be used to determine the integrity of a product using time-sensitive inspection data relating to a particular product. For example, NDT inspections may observe the "wear and tear" of a product over a particular time-period.

Many forms of NDT are currently known. For example, perhaps the most common NDT method is visual examination. During a visual examination, an inspector may, for example, simply visually inspect an object for visible imperfections. Alternatively, visual inspections may be conducted using optical technologies such as a computer-guided camera, a borescope, etc. Radiography is another form of NDT. Radiography relates to using radiation (e.g., x-rays and/or gamma rays) to detect thickness and/or density changes to a product, which may denote a defect in the product. Further, ultrasonic testing relates to transmitting high-frequency sound waves into a product to detect changes and/or imperfections to the product. Using a pulse-echo technique, sound it introduced into the product and echoes from the imperfections are returned to a receiver, signaling that the imperfection exists. Many other forms of NDT exist. For example, magnetic particle testing, penetrant testing, electromagnetic testing, leak testing, and acoustic emission testing, to name a few.

Oftentimes, product inspections may be quite complex due to the complex nature of the product being tested. For example, airplanes are very complex machines where safety and inspection standards are of the utmost importance. The Boeing 777 aircraft may have as many 3 million parts. Accordingly, a tremendous amount of time and effort is used to inspect these aircraft on a periodic basis. Further, historical data relating to previous inspections may be used to compare and contrast inspection results to understand trending data. Further, inspection data for an entire fleet of products (e.g., a fleet of Boeing 777's) may be useful for inspection purposes, as may reference materials provided by a manufacturer or other source. As may be appreciated, massive amounts of data may be gathered and used in the inspection process. This data may be pulled from many sources and may be crucial for accurate inspection.

Unfortunately, managing inspections may be quite complex. There may be numerous assets or objects needing to be inspected across a multitude of geographies. Further, there may be a limited number of resources (e.g., inspectors and/or inspection devices) available to complete the inspections. In conventional inspection systems, inspection management has generally been a manual process, consuming a large amount of resources to plan, execute, and review inspections. Accordingly, improved systems and methods for managing inspections are desirable.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, an inspection management system is provided. The inspection management system includes an inspection data provider that provides inspection data relating to an inspector, one or more devices used to complete an inspection, one or more assets associated with an inspection, or any combination thereof. The inspection management system also includes a display that presents one or more graphical user interfaces and a processor that obtains the inspection data from the inspection data provider and presents an inspection management graphical user interface via the display, based upon the inspection data.

In a second embodiment, a tangible, non-transitory, machine-readable medium is provided. The medium includes machine-readable instructions to: obtain inspection data from an inspection data provider, the inspection data comprising data related to an inspector, one or more devices used to complete an inspection, one or more assets associated with an inspection, or any combination thereof; and present an inspection management graphical user interface via a display, based upon the inspection data.

In a third embodiment, a method is provided that includes obtaining, via communications circuitry, inspection data from an inspection data provider, the inspection data including data related to an inspector, one or more devices used to complete an inspection, one or more assets associated with an inspection, or any combination thereof. The method further includes presenting, via processor instructions directed to an electronic display, an inspection management graphical user interface, based upon the inspection data, the inspection management graphical user interface providing data sourced locally, data sourced remotely, or both.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
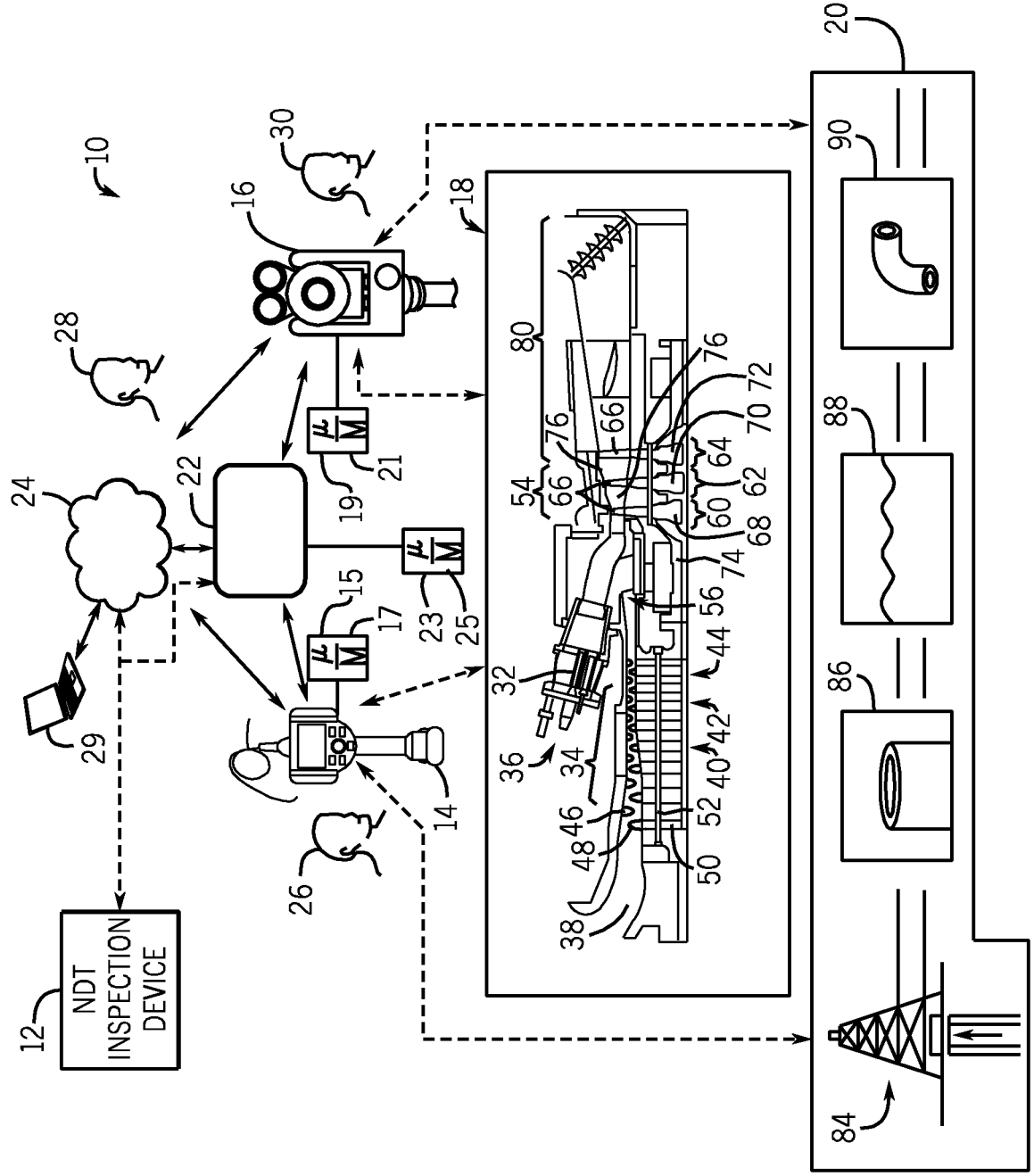
FIG. 1 is a block diagram illustrating an embodiment of a distributed non-destructive testing (NDT) system, including a mobile device.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may apply to a variety of inspection and testing techniques, including non-destructive testing (NDT) or inspection systems. In the NDT system, certain techniques such as borescopic inspection, weld inspection, remote visual inspections, x-ray inspection, ultrasonic inspection, eddy current inspection, and the like, may be used to analyze and detect a variety of conditions, including but not limited to corrosion, equipment wear and tear, cracking, leaks, and so on. The techniques described herein provide for improved NDT systems suitable for borescopic inspection, remote visual inspections, x-ray inspection, ultrasonic inspection, and/or eddy current inspection, enabling enhanced data gathering, data analysis, inspection/testing processes, and NDT collaboration techniques.

The improved NDT systems described herein may include inspection equipment using wireless conduits suitable for communicatively coupling the inspection equipment to mobile devices, such as tablets, smart phones, and augmented reality eyeglasses; to computing devices, such as notebooks, laptops, workstations, personal computers; and to "cloud" computing systems, such as cloud-based NDT ecosystems, cloud analytics, cloud-based collaboration and workflow systems, distributed computing systems, expert systems and/or knowledge-based systems. Indeed, the techniques described herein may provide for enhanced NDT data gathering, analysis, and data distribution, thus improving the detection of undesired conditions, enhancing maintenance activities, and increasing returns on investment (ROI) of facilities and equipment.

In one embodiment, a tablet may be communicatively coupled to the NDT inspection device (e.g., borescope, transportable pan-tilt-zoom camera, eddy current device, x-ray inspection device, ultrasonic inspection device), such as a MENTOR™ NDT inspection device, available from General Electric, Co., of Schenectady, N.Y., and used to provide, for example, enhanced wireless display capabilities, remote control, data analytics and/or data communications to the NDT inspection device. While other mobile devices may be used, the use of the tablet is apt, however, insofar as the tablet may provide for a larger, higher resolution display, more powerful processing cores, an increased memory, and improved battery life. Accordingly, the tablet may address certain issues, such as providing for improved visualization of data, improving the manipulatory control of the inspection device, and extending collaborative sharing to a plurality of external systems and entities.

Keeping the foregoing in mind, the present disclosure is directed towards sharing data acquired from the NDT system and/or control of applications and/or devices in the NDT system. Generally, data generated from the NDT system may be automatically distributed to various people or groups of people using techniques disclosed herein. Moreover, content displayed by an application used to monitor and/or control devices in the NDT system may be shared between individuals to create a virtual collaborative environment for monitoring and controlling the devices in the NDT system.

By way of introduction, and turning now to FIG. 1, the figure is a block diagram of an embodiment of distributed NDT system 10. In the depicted embodiment, the distributed NDT system 10 may include one or more NDT inspection devices 12. The NDT inspection devices 12 may be divided into at least two categories. In one category, depicted in FIG. 1, the NDT inspection devices 12 may include devices suitable for visually inspecting a variety of equipment and environments. In another category, described in more detail with respect to FIG. 2 below, the NDT devices 12 may include devices providing for alternatives to visual inspection modalities, such as x-ray inspection modalities, eddy current inspection modalities, and/or ultrasonic inspection modalities.

In the depicted first example category of FIG. 1, the NDT inspection devices 12 may include a borescope 14 having one or more processors 15 and a memory 17, and a transportable pan-tilt-zoom (PTZ) camera 16 having one or more processors 19 and a memory 21. In this first category of visual inspection devices, the bore scope 14 and PTZ camera 16 may be used to inspect, for example, a turbo machinery 18, and a facility or site 20. As illustrated, the bore scope 14 and the PTZ camera 16 may be communicatively coupled to a mobile device 22 also having one or more processors 23 and a memory 25. The mobile device 22 may include, for example, a tablet, a cell phone (e.g., smart phone), a notebook, a laptop, or any other mobile computing device. The use of a tablet, however, is apt insofar as the tablet provides for a good balance between screen size, weight, computing power, and battery life. Accordingly, in one embodiment, the mobile device 22 may be the tablet mentioned above, that provides for touchscreen input. The mobile device 22 may be communicatively coupled to the NDT inspection devices 12, such as the bore scope 14 and/or the PTZ camera 16, through a variety of wireless or wired conduits. For example, the wireless conduits may include WiFi (e.g., Institute of Electrical and Electronics Engineers [IEEE] 802.11X), cellular conduits (e.g., high speed packet access [HSPA], HSPA+, long term evolution [LTE], WiMax), near field communications (NFC), Bluetooth, personal area networks (PANs), and the like. The wireless conduits may use a variety of communication protocols, such as TCP/IP, UDP, SCTP, socket layers, and so on. In certain embodiments, the wireless or wired conduits may include secure layers, such as secure socket layers (SSL), virtual private network (VPN) layers, encrypted layers, challenge key authentication layers, token authentication layers, and so on. Wired conduits may include proprietary cabling, RJ45 cabling, co-axial cables, fiber optic cables, and so on.

Additionally or alternatively, the mobile device 22 may be communicatively coupled to the NDT inspection devices 12, such as the borescope 14 and/or the PTZ camera 16, through the "cloud" 24. Indeed, the mobile device 22 may use the cloud 24 computing and communications techniques (e.g., cloud-computing network), including but not limited to HTTP, HTTPS, TCP/IP, service oriented architecture (SOA) protocols (e.g., simple object access protocol [SOAP], web services description languages (WSDLs)) to interface with the NDT inspection devices 12 from any geographic location, including geographic locations remote from the physical location about to undergo inspection. Further, in one embodiment, the mobile device 22 may provide "hot spot" functionality in which mobile device 22 may provide wireless access point (WAP) functionality suitable for connecting the NDT inspection devices 12 to other systems in the cloud 24, or connected to the cloud 24, such as a computing system 29 (e.g., computer, laptop, virtual machine(s) [VM], desktop, workstation). Accordingly, collaboration may be enhanced by providing for multi-party workflows, data gathering, and data analysis.

For example, a borescope operator 26 may physically manipulate the borescope 14 at one location, while a mobile device operator 28 may use the mobile device 22 to interface with and physically manipulate the bore scope 14 at a second location through remote control techniques. The second location may be proximate to the first location, or geographically distant from the first location. Likewise, a camera operator 30 may physically operate the PTZ camera 16 at a third location, and the mobile device operator 28 may remote control PTZ camera 16 at a fourth location by using the mobile device 22. The fourth location may be proximate to the third location, or geographically distant from the third location. Any and all control actions performed by the operators 26 and 30 may be additionally performed by the operator 28 through the mobile device 22. Additionally, the operator 28 may communicate with the operators 26 and/or 30 by using the devices 14, 16, and 22 through techniques such as voice over IP (VOIP), virtual whiteboarding, text messages, and the like. By providing for remote collaboration techniques between the operator 28 operator 26, and operator 30, the techniques described herein may provide for enhanced workflows and increase resource efficiencies. Indeed, nondestructive testing processes may leverage the communicative coupling of the cloud 24 with the mobile device 22, the NDT inspection devices 12, and external systems coupled to the cloud 24.

In one mode of operation, the mobile device 22 may be operated by the bore scope operator 26 and/or the camera operator 30 to leverage, for example, a larger screen display, more powerful data processing, as well as a variety of interface techniques provided by the mobile device 22, as described in more detail below. Indeed, the mobile device 22 may be operated alongside or in tandem with the devices 14 and 16 by the respective operators 26 and 30. This enhanced flexibility provides for better utilization of resources, including human resources, and improved inspection results.

Whether controlled by the operator 28, 26, and/or 30, the borescope 14 and/or PTZ camera 16 may be used to visually inspect a wide variety of equipment and facilities. For example, the bore scope 14 may be inserted into a plurality of borescope ports and other locations of the turbomachinery 18, to provide for illumination and visual observations of a number of components of the turbomachinery 18. In the depicted embodiment, the turbo machinery 18 is illustrated as a gas turbine suitable for converting carbonaceous fuel into mechanical power. However, other equipment types may be inspected, including compressors, pumps, turbo expanders, wind turbines, hydroturbines, industrial equipment, and/or residential equipment. The turbomachinery 18 (e.g., gas turbine) may include a variety of components that may be inspected by the NDT inspection devices 12 described herein.

With the foregoing in mind, it may be beneficial to discuss certain turbomachinery 18 components that may be inspected by using the embodiments disclosed herein. For example, certain components of the turbomachinery 18 depicted in FIG. 1, may be inspected for corrosion, erosion, cracking, leaks, weld inspection, and so on. Mechanical systems, such as the turbomachinery 18, experience mechanical and thermal stresses during operating conditions, which may require periodic inspection of certain components. During operations of the turbomachinery 18, a fuel such as natural gas or syngas, may be routed to the turbomachinery 18 through one or more fuel nozzles 32 into a combustor 36. Air may enter the turbomachinery 18 through an air intake section 38 and may be compressed by a compressor 34. The compressor 34 may include a series of stages 40, 42, and 44 that compress the air. Each stage may include one or more sets of stationary vanes 46 and blades 48 that rotate to progressively increase the pressure to provide compressed air. The blades 48 may be attached to rotating wheels 50 connected to a shaft 52. The compressed discharge air from the compressor 34 may exit the compressor 34 through a diffuser section 56 and may be directed into the combustor 36 to mix with the fuel. For example, the fuel nozzles 32 may inject a fuel-air mixture into the combustor 36 in a suitable ratio for optimal combustion, emissions, fuel consumption, and power output. In certain embodiments, the turbomachinery 18 may include multiple combustors 36 disposed in an annular arrangement. Each combustor 36 may direct hot combustion gases into a turbine 54.

As depicted, the turbine 54 includes three separate stages 60, 62, and 64 surrounded by a casing 76. Each stage 60, 62, and 64 includes a set of blades or buckets 66 coupled to a respective rotor wheel 68, 70, and 72, which are attached to a shaft 74. As the hot combustion gases cause rotation of turbine blades 66, the shaft 74 rotates to drive the compressor 34 and any other suitable load, such as an electrical generator. Eventually, the turbomachinery 18 diffuses and exhausts the combustion gases through an exhaust section 80. Turbine components, such as the nozzles 32, intake 38, compressor 34, vanes 46, blades 48, wheels 50, shaft 52, diffuser 56, stages 60, 62, and 64, blades 66, shaft 74, casing 76, and exhaust 80, may use the disclosed embodiments, such as the NDT inspection devices 12, to inspect and maintain said components.

Additionally, or alternatively, the PTZ camera 16 may be disposed at various locations around or inside of the turbo machinery 18, and used to procure visual observations of these locations. The PTZ camera 16 may additionally include one or more lights suitable for illuminating desired locations, and may further include zoom, pan and tilt techniques described in more detail below with respect to FIG. 4, useful for deriving observations around in a variety of difficult to reach areas. The borescope 14 and/or the camera 16 may be additionally used to inspect the facilities 20, such as an oil and gas facility 20. Various equipment such as oil and gas equipment 84, may be inspected visually by using the borescope 14 and/or the PTZ camera 16. Advantageously, locations such as the interior of pipes or conduits 86, underwater (or underfluid) locations 88, and difficult to observe locations such as locations having curves or bends 90, may be visually inspected by using the mobile device 22 through the borescope 14 and/or PTZ camera 16. Accordingly, the mobile device operator 28 may more safely and efficiently inspect the equipment 18, 84 and locations 86, 88, and 90, and share observations in real-time or near real-time with location geographically distant from the inspection areas. It is to be understood that other NDT inspection devices 12 may be use the embodiments described herein, such as fiberscopes (e.g., articulating fiberscope, non-articulating fiberscope), and remotely operated vehicles (ROVs), including robotic pipe inspectors and robotic crawlers.

Figure 2:
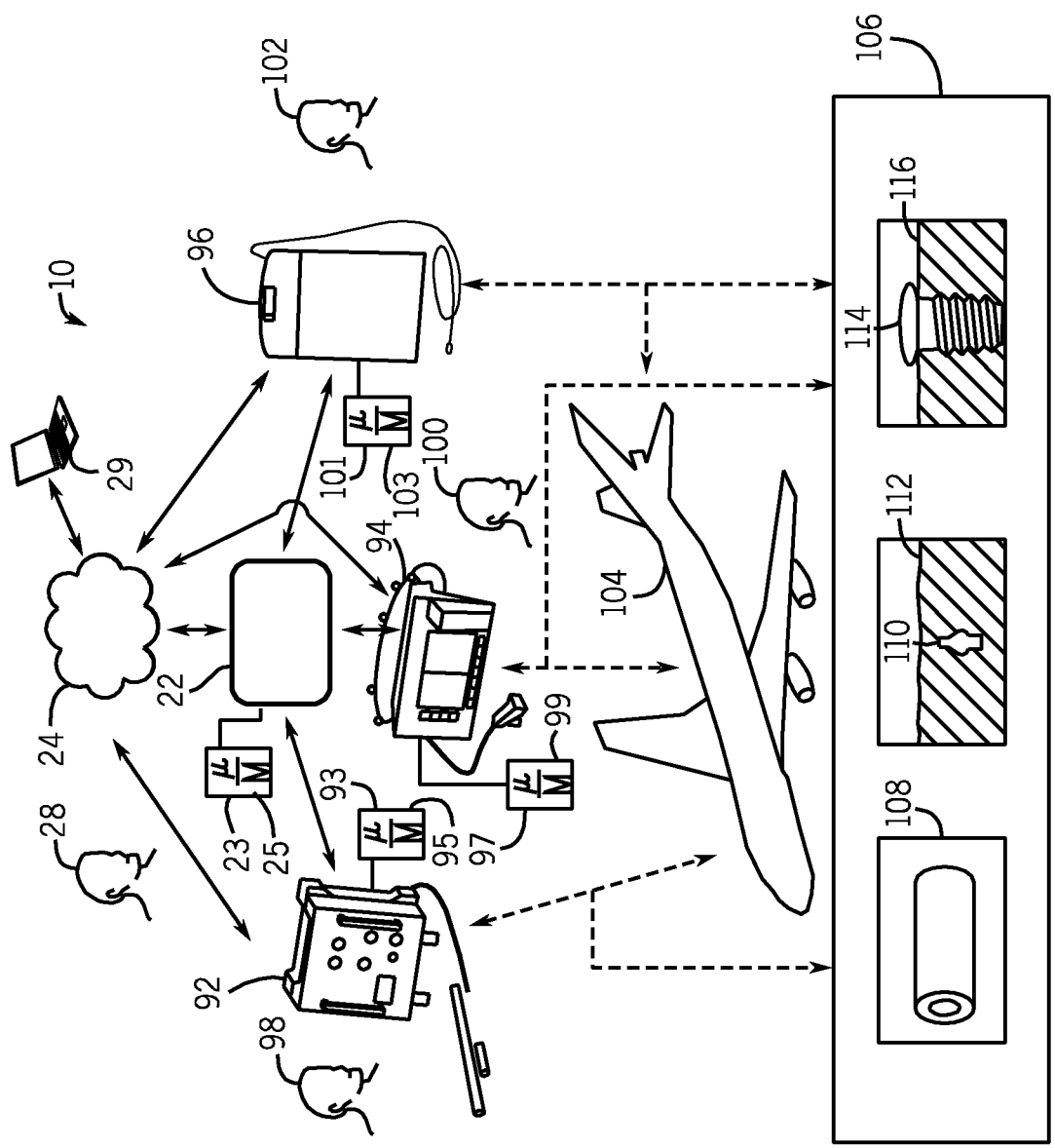
FIG. 2 is a block diagram illustrating further details of an embodiment of the distributed NDT system of FIG. 1.

Turning now to FIG. 2, the figure is a block diagram of an embodiment of the distributed NDT system 10 depicting the second category of NDT inspection devices 12 that may be able to provide for alternative inspection data to visual inspection data. For example, the second category of NDT inspection devices 12 may include an eddy current inspection device 92, an ultrasonic inspection device, such as an ultrasonic flaw detector 94, and an x-ray inspection device, such a digital radiography device 96. The eddy current inspection device 92 may include one or more processors 93 and a memory 95. Likewise, the ultrasonic flaw detector 94 may include one or more processors 97 and a memory 104. Similarly, the digital radiography device 96 may include one or more processors 101 and a memory 103. In operations, the eddy current inspection device 92 may be operated by an eddy current operator 98, the ultrasonic flaw detector 94 may be operated by an ultrasonic device operator 100, and the digital radiography device 96 may be operated by a radiography operator 102.

As depicted, the eddy current inspection device 92, the ultrasonic flaw detector 94, and the digital radiography inspection device 96, may be communicatively coupled to the mobile device 22 by using wired or wireless conduits, including the conduits mentioned above with respect to FIG. 1. Additionally, or alternatively, the devices 92, 94, and 96 may be coupled to the mobile device 22 by using the cloud 24, for example the borescope 14 may be connected to a cellular "hotspot," and use the hotspot to connect to one or more experts in borescopic inspection and analsysis. Accordingly, the mobile device operator 28 may remotely control various aspects of operations of the devices 92, 94, and 96 by using the mobile device 22, and may collaborate with the operators 98, 100, and 102 through voice (e.g., voice over IP [VOIP]), data sharing (e.g., whiteboarding), providing data analytics, expert support and the like, as described in more detail herein.

Accordingly, it may be possible to enhance the visual observation of various equipment, such as an aircraft system 104 and facilities 106, with x-ray observation modalities, ultrasonic observation modalities, and/or eddy current observation modalities. For example, the interior and the walls of pipes 108 may be inspected for corrosion and/or erosion. Likewise, obstructions or undesired growth inside of the pipes 108 may be detected by using the devices 92, 94, and/or 96. Similarly, fissures or cracks 110 disposed inside of certain ferrous or non-ferrous material 112 may be observed. Additionally, the disposition and viability of parts 114 inserted inside of a component 116 may be verified. Indeed, by using the techniques described herein, improved inspection of equipment and components 104, 108, 112 and 116 may be provided. For example, the mobile device 22 may be used to interface with and provide remote control of the devices 14, 16, 92, 94, and 96.

Figure 3:
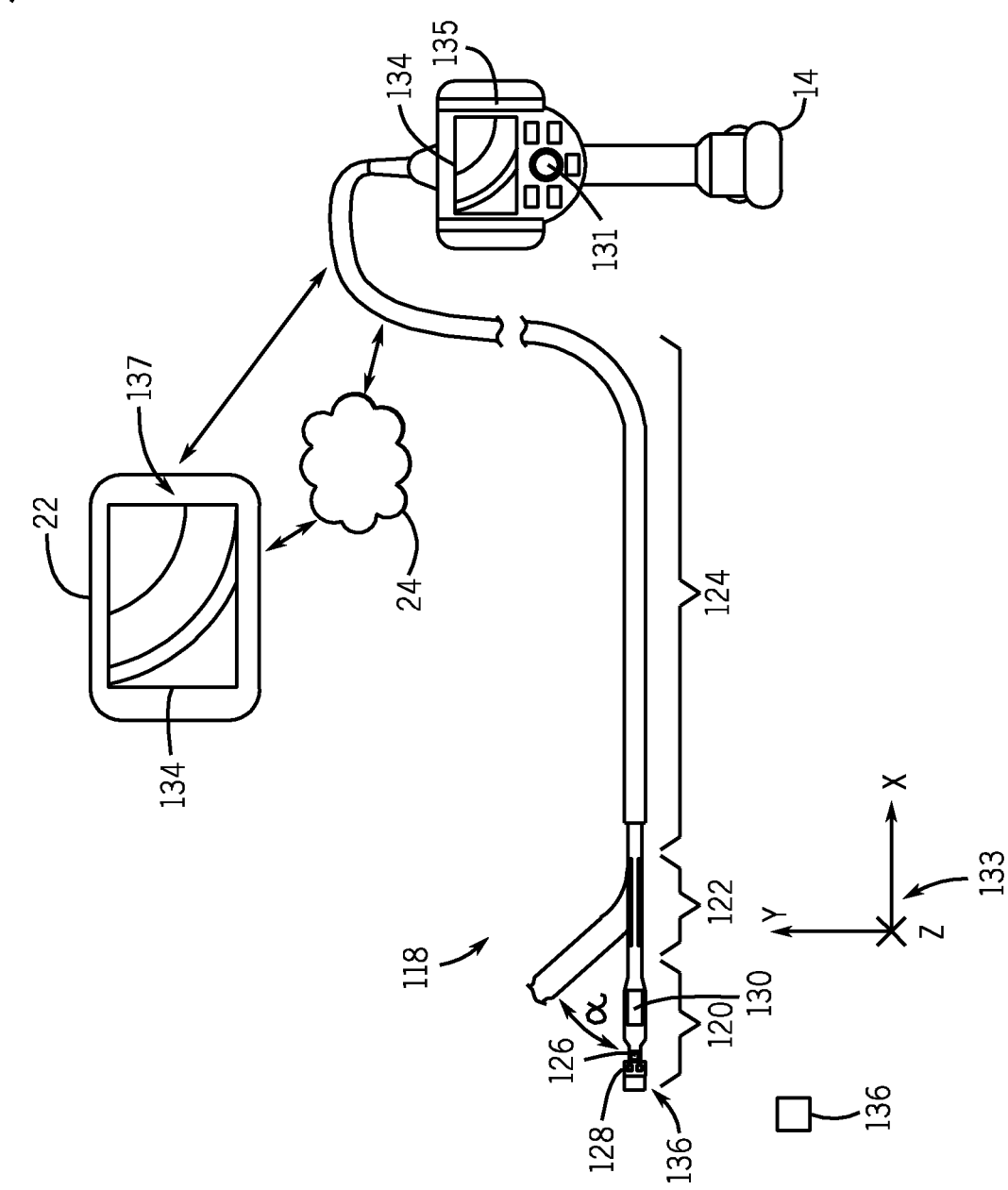
FIG. 3 is a front view illustrating an embodiment of a borescope system 14 communicatively coupled to the mobile device of FIG. 1 and a "cloud;"

FIG. 3 is a front view of the borescope 14 coupled to the mobile device 22 and the cloud 24. Accordingly, the boresecope 14 may provide data to any number of devices connected to the cloud 24 or inside the cloud 24. As mentioned above, the mobile device 22 may be used to receive data from the borescope 14, to remote control the borescope 14, or a combination thereof. Indeed, the techniques described herein enable, for example, the communication of a variety of data from the borescope 14 to the mobile device 22, including but not limited to images, video, and sensor measurements, such as temperature, pressure, flow, clearance (e.g., measurement between a stationary component and a rotary component), and distance measurements. Likewise, the mobile device 22 may communicate control instructions, reprogramming instructions, configuration instructions, and the like, as described in more detail below.

As depicted the borescope 14, includes an insertion tube 118 suitable for insertion into a variety of location, such as inside of the turbomachinery 18, equipment 84, pipes or conduits 86, underwater locations 88, curves or bends 90, varies locations inside or outside of the aircraft system 104, the interior of pipe 108, and so on. The insertion tube 118 may include a head end section 120, an articulating section 122, and a conduit section 124. In the depicted embodiment, the head end section 120 may include a camera 126, one or more lights 128 (e.g., LEDs), and sensors 130. As mentioned above, the borescope's camera 126 may provide images and video suitable for inspection. The lights 128 may be used to provide for illumination when the head end 120 is disposed in locations having low light or no light.

During use, the articulating section 122 may be controlled, for example, by the mobile device 22 and/or a physical joy stick 131 disposed on the borescope 14. The articulating sections 122 may steer or "bend" in various dimensions. For example, the articulation section 122 may enable movement of the head end 120 in an X-Y plane X-Z plane and/or Y-Z plane of the depicted XYZ axes 133. Indeed, the physical joystick 131 and/or the mobile device 22 may both be used alone or in combination, to provide control actions suitable for disposing the head end 120 at a variety of angles, such as the depicted angle α. In this manner, the borescope head end 120 may be positioned to visually inspect desired locations. The camera 126 may then capture, for example, a video 134, which may be displayed in a screen 135 of the borescope 14 and a screen 137 of the mobile device 22, and may be recorded by the borescope 14 and/or the mobile device 22. In one embodiment, the screens 135 and 137 may be multi-touchscreens using capacitance techniques, resistive techniques, infrared grid techniques, and the like, to detect the touch of a stylus and/or one or more human fingers. Additionally or alternatively, images and the video 134 may be transmitted into the cloud 24.

Other data, including but not limited to sensor 130 data, may additionally be communicated and/or recorded by the borescope 14. The sensor 130 data may include temperature data, distance data, clearance data (e.g., distance between a rotating and a stationary component), flow data, and so on. In certain embodiments, the borescope 14 may include a plurality of replacement tips 136. For example, the replacement tips 136 may include retrieval tips such as snares, magnetic tips, gripper tips, and the like. The replacement tips 136 may additionally include cleaning and obstruction removal tools, such as wire brushes, wire cutters, and the like. The tips 136 may additionally include tips having differing optical characteristics, such as focal length, stereoscopic views, 3-dimensional (3D) phase views, shadow views, and so on. Additionally or alternatively, the head end 120 may include a removable and replaceable head end 120. Accordingly, a plurality of head ends 120 may be provided at a variety of diameters, and the insertion tube 118 maybe disposed in a number of locations having openings from approximately one millimeter to ten millimeters or more. Indeed, a wide variety of equipment and facilities may be inspected, and the data may be shared through the mobile device 22 and/or the cloud 24.

Figure 4:
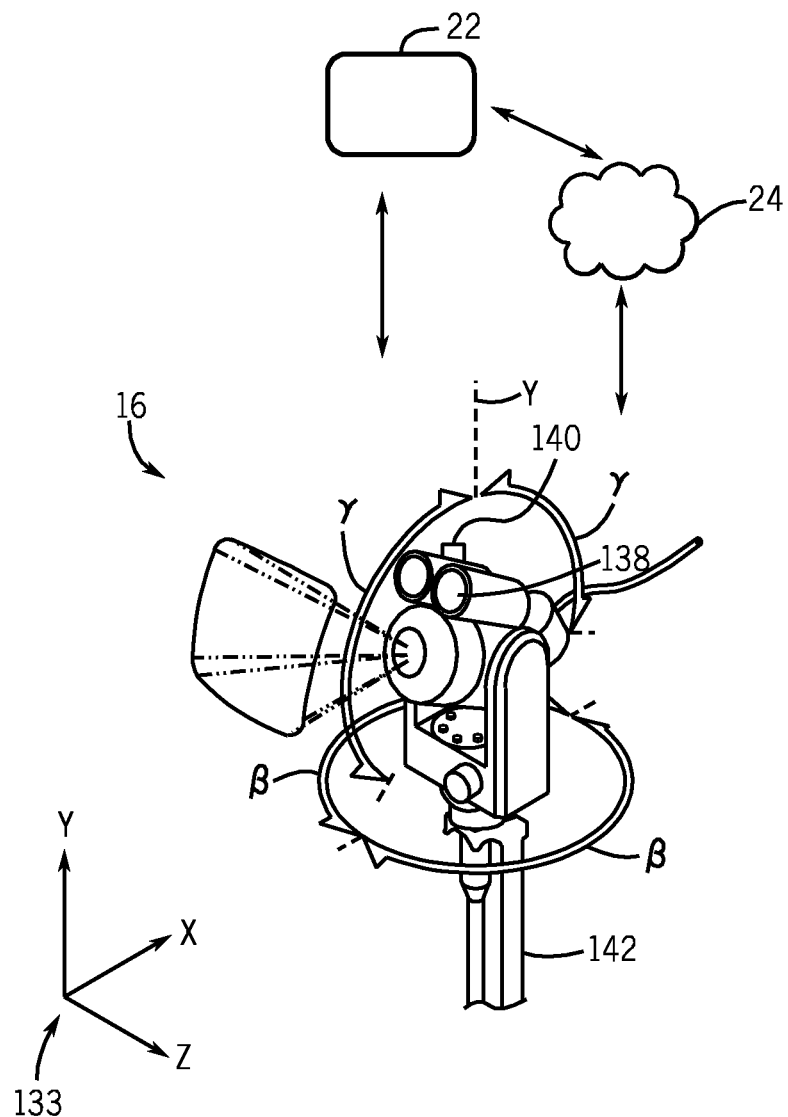
FIG. 4 is an illustration of an embodiment of a pan-tilt-zoom (PTZ) camera system communicatively coupled to the mobile device of FIG. 1.

FIG. 4 is a perspective view of an embodiment of the transportable PTZ camera 16 communicatively coupled to the mobile device 22 and to the cloud 24. As mentioned above, the mobile device 22 and/or the cloud 24 may remotely manipulate the PTZ camera 16 to position the PTZ camera 16 to view desired equipment and locations. In the depicted example, the PTZ camera 16 may be tilted and rotated about the Y-axis. For example, the PTZ camera 16 may be rotated at an angle β between approximately 0° to 180°, 0° to 270°, 0° to 360°, or more about the Y-axis. Likewise, the PTZ camera 16 may be tilted, for example, about the Y-X plane at an angle γ of approximately 0° to 100°, 0° to 120°, 0° to 150°, or more with respect to the Y-Axis. Lights 138 may be similarly controlled, for example, to active or deactivate, and to increase or decrease a level of illumination (e.g., lux) to a desired value. Sensors 140, such as a laser rangefinder, may also be mounted onto the PTZ camera 16, suitable for measuring distance to certain objects. Other sensors 140 may be used, including long-range temperature sensors (e.g., infrared temperature sensors), pressure sensors, flow sensors, clearance sensors, and so on.

The PTZ camera 16 may be transported to a desired location, for example, by using a shaft 142. The shaft 142 enables the camera operator 30 to move the camera and to position the camera, for example, inside of locations 86, 108, underwater 88, into hazardous (e.g., hazmat) locations, and so on. Additionally, the shaft 142 may be used to more permanently secure the PTZ camera 16 by mounting the shaft 142 onto a permanent or semi-permanent mount. In this manner, the PTZ camera 16 may be transported and/or secured at a desired location. The PTZ camera 16 may then transmit, for example by using wireless techniques, image data, video data, sensor 140 data, and the like, to the mobile device 22 and/or cloud 24. Accordingly, data received from the PTZ camera 16 may be remotely analyzed and used to determine the condition and suitability of operations for desired equipment and facilities. Indeed, the techniques described herein may provide for a comprehensive inspection and maintenance process suitable for planning, inspecting, analyzing, and/or sharing a variety of data by using the aforementioned devices 12, 14, 16, 22, 92, 94, 96, and the cloud 24, as described in more detail below with respect to FIG. 5.

Figure 5:
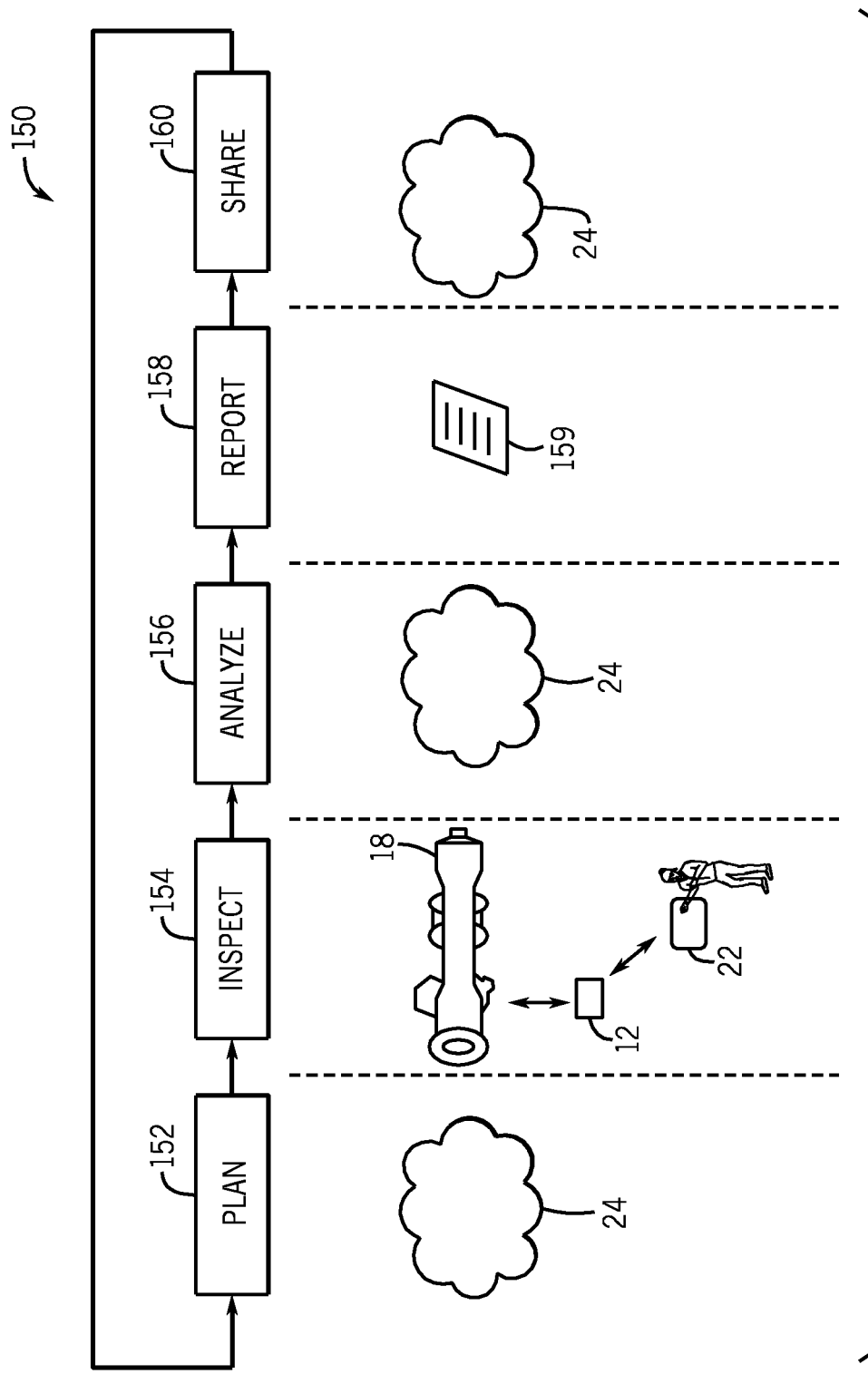
FIG. 5 is a flowchart illustrating an embodiment of a process useful in using the distributed NDT system for planning, inspecting, analyzing, reporting, and sharing of data, such as inspection data.

FIG. 5 is a flowchart of an embodiment of a process 150 suitable for planning, inspecting, analyzing, and/or sharing a variety of data by using the aforementioned devices 12, 14, 16, 22, 92, 94, 96, and the cloud 24. Indeed, the techniques described herein may use the devices 12, 14, 16, 22, 92, 94, 96 to enable processes, such as the depicted process 150, to more efficiently support and maintain a variety of equipment. In certain embodiments, the process 150 or portions of the process 150 may be included in non-transitory computer-readable media stored in memory, such as the memory 15, 19, 23, 93, 97, 101 and executable by one or more processors, such as the processors 17, 21, 25, 95, 99, 103.

In one example, the process 150 may plan (block 152) for inspection and maintenance activities. Data acquired by using the devices 12, 14, 16, 22, 42, 44, 46, an others, such as fleet data acquired from a fleet of turbomachinery 18, from equipment users (e.g., aircraft 104 service companies), and/or equipment manufacturers, may be used to plan (block 152) maintenance and inspection activities, more efficient inspection schedules for machinery, flag certain areas for a more detailed inspection, and so on. The process 150 may then enable the use of a single mode or a multi-modal inspection (block 154) of desired facilities and equipment (e.g., turbomachinery 18). As mentioned above, the inspection (block 154) may use any one or more of the NDT inspection devices 12 (e.g., borescope 14, PTZ camera 16, eddy current inspection device 92, ultrasonic flaw detector 94, digital radiography device 96), thus providing with one or more modes of inspection (e.g., visual, ultrasonic, eddy current, x-ray). In the depicted embodiment, the mobile device 22 may be used to remote control the NDT inspection devices 12, to analyze data communicated by the NDT inspection devices 12, to provide for additional functionality not included in the NDT inspection devices 12 as described in more detail herein, to record data from the NDT inspection devices 12, and to guide the inspection (block 154), for example, by using menu-driven inspection (MDI) techniques, among others.

Results of the inspection (block 154), may then be analyzed (block 156), for example, by using the NDT device 12, by transmitting inspection data to the cloud 24, by using the mobile device 22, or a combination thereof. The analysis may include engineering analysis useful in determining remaining life for the facilities and/or equipment, wear and tear, corrosion, erosion, and so forth. The analysis may additionally include operations research (OR) analysis used to provide for more efficient parts replacement schedules, maintenance schedules, equipment utilization schedules, personnel usage schedules, new inspection schedules, and so on. The analysis (block 156) may then be reported (block 158), resulting in one or more reports 159, including reports created in or by using the cloud 24, detailing the inspection and analysis performed and results obtained. The reports 159 may then be shared (block 160), for example, by using the cloud 24, the mobile device 22, and other techniques, such as workflow sharing techniques. In one embodiment, the process 150 may be iterative, thus, the process 150 may iterate back to planning (block 152) after the sharing (block 160) of the reports 159. By providing for embodiments useful in using the devices (e.g., 12, 14, 16, 22, 92, 94, 96) described herein to plan, inspect, analyze, report, and share data, the techniques described herein may enable a more efficient inspection and maintenance of the facilities 20, 106 and the equipment 18, 104. Indeed, the transfer of multiple categories of data may be provided, as described in more detail below with respect to FIG. 6.

Figure 6:
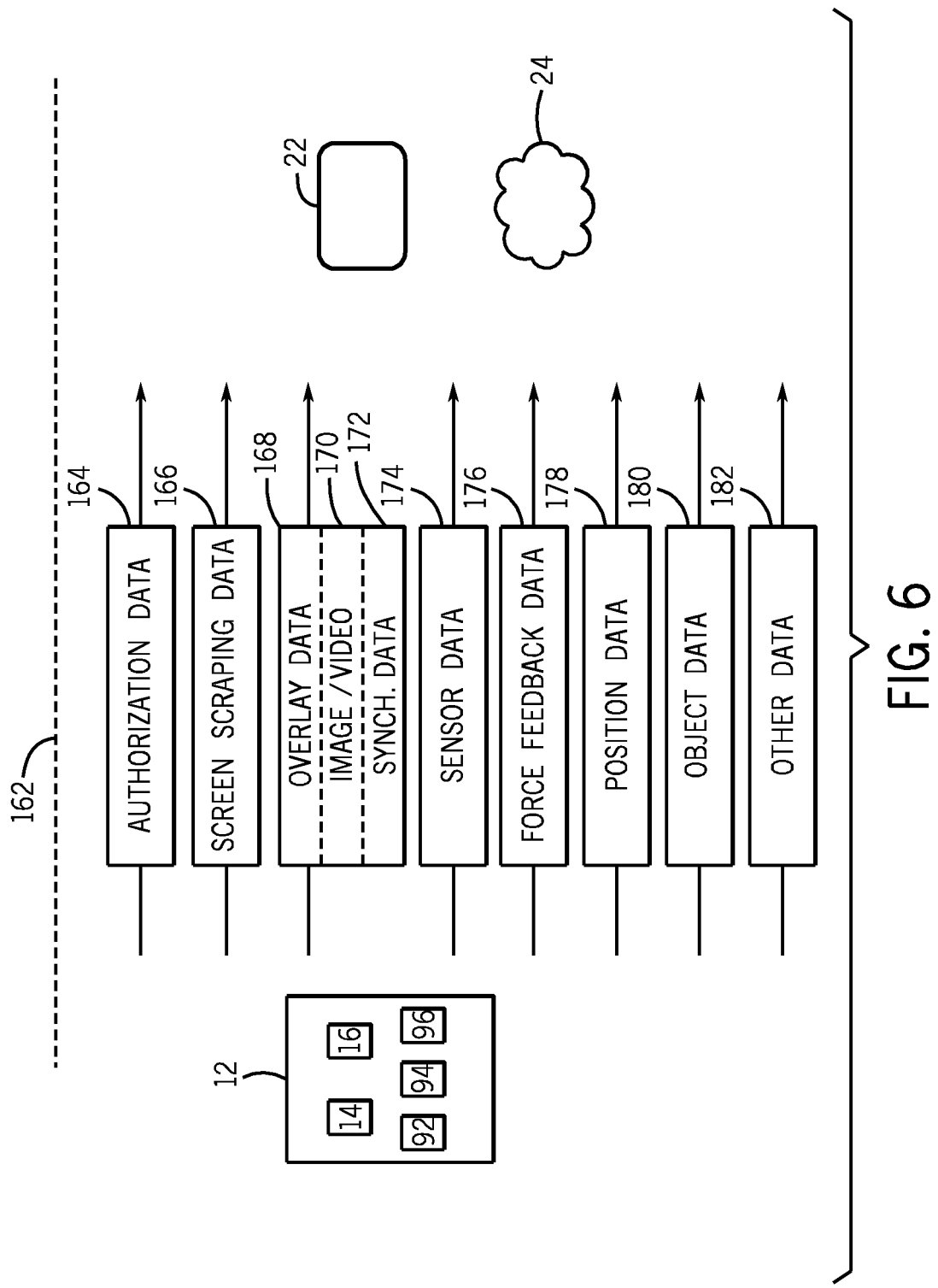
FIG. 6 is a block diagram of an embodiment of information flow through a wireless conduit.

FIG. 6 is a data flow diagram depicting an embodiment of the flow of various data categories originating from the NDT inspection devices 12 (e.g., devices 14, 16, 92, 94, 96) and transmitted to the mobile device 22 and/or the cloud 24. As mentioned above, the NDT inspection devices 12 may use a wireless conduit 162 to transmit the data. In one embodiment, the wireless conduit 112 may include WiFi (e.g., 802.11X), cellular conduits (e.g., HSPA, HSPA+, LTE, WiMax), NFC, Bluetooth, PANs, and the like. The wireless conduit 162 may use a variety of communication protocols, such as TCP/IP, UDP, SCTP, socket layers, and so on. In certain embodiments, the wireless conduit 162 may include secure layers, such as SSL, VPN layers, encrypted layers, challenge key authentication layers, token authentication layers, and so on. Accordingly, an authorization data 164 may be used to provide any number of authorization or login information suitable to pair or otherwise authenticate the NDT inspection device 12 to the mobile device 22 and/or the cloud 24. Additionally, the wireless conduit 162 may dynamically compress data, depending on, for example, currently available bandwidth and latency. The mobile device 22 may then uncompress and display the data. Compression/decompression techniques may include H.261, H.263, H.264, moving picture experts group (MPEG), MPEG-1, MPEG-2, MPEG-3, MPEG-4, DivX, and so on.

In certain modalities (e.g., visual modalities), images and video may be communicated by using certain of the NDT inspection devices 12. Other modalities may also send video, sensor data, and so on, related to or included in their respective screens. The NDT inspection device 12 may, in addition to capturing images, overlay certain data onto the image, resulting in a more informative view. For example, a borescope tip map may be overlaid on the video, showing an approximation of the disposition of a borescope tip during insertion so as to guide the operator 26 to more accurately position the borescope camera 126. The overlay tip map may include a grid having four quadrants, and the tip 136 disposition may be displayed as dot in any portion or position inside of the four quadrants. A variety of overlays may be provided, as described in more detail below, including measurement overlays, menu overlays, annotation overlays, and object identification overlays. The image and video data, such as the video 84, may then be displayed, with the overlays generally displayed on top of the image and video data.

In one embodiment, the overlays, image, and video data may be "screen scraped" from the screen 135 and communicated as screen scrapping data 166. The screen scrapping data 166 may then be displayed on the mobile device 22 and other display devices communicatively coupled to the cloud 24. Advantageously, the screen scrapping data 166 may be more easily displayed. Indeed, because pixels may include both the image or video and overlays in the same frame, the mobile device 22 may simply display the aforementioned pixels. However, providing the screen scraping data may merge both the images with the overlays, and it may be beneficial to separate the two (or more) data streams. For example, the separate data streams (e.g., image or video stream, overlay stream) may be transmitted approximately simultaneously, thus providing for faster data communications. Additionally, the data streams may be analyzed separately, thus improving data inspection and analysis.

Accordingly, in one embodiment, the image data and overlays may be separated into two or more data streams 168 and 170. The data stream 168 may include only overlays, while the data stream 170 may include images or video. In one embodiment, the images or video 170 may be synchronized with the overlays 168 by using a synchronization signal 172. For example, the synchronization signal may include timing data suitable to match a frame of the data stream 170 with one or more data items included in the overlay stream 168. In yet another embodiment, no synchronization data 172 data may be used. Instead, each frame or image 170 may include a unique ID, and this unique ID may be matched to one or more of the overlay data 168 and used to display the overlay data 168 and the image data 170 together.

The overlay data 168 may include a tip map overlay. For example, a grid having four squares (e.g., quadrant grid) may be displayed, along with a dot or circle representing a tip 136 position. This tip map may thus represent how the tip 136 is being inserted inside of an object. A first quadrant (top right) may represent the tip 136 being inserted into a top right corner looking down axially into the object, a second quadrant (top left) may represent the tip 136 being inserted into a left right corner looking down axially, a third quadrant (bottom left) may represent the tip 136 being inserted into a bottom left corner, and a fourth quadrant (bottom right) may represent the tip 136 being inserted into a bottom right corner. Accordingly, the borescope operator 26 may more easily guide insertion of the tip 136.

The overlay data 168 may also include measurement overlays. For example, measurement such as length, point to line, depth, area, multi-segment line, distance, skew, and circle gauge may be provided by enabling the user to overlay one or more cursor crosses (e.g., "+") on top of an image. In one embodiment a stereo probe measurement tip 136, or a shadow probe measurement tip 136 may be provided, suitable for measurements inside of objects, including stereoscopic measurements and/or by projecting a shadow onto an object. By placing a plurality of cursor icons (e.g., cursor crosses) over an image, the measurements may be derived using stereoscopic techniques. For example, placing two cursors icons may provide for a linear point-to-point measurement (e.g., length). Placing three cursor icons may provide for a perpendicular distance from a point to a line (e.g., point to line). Placing four cursor icons may provide for a perpendicular distance between a surface (derived by using three cursors) and a point (the fourth cursor) above or below the surface (e.g., depth). Placing three or more cursors around a feature or defect may then give an approximate area of the surface contained inside the cursors. Placing three or more cursors may also enable a length of a multi-segment line following each cursor.

Likewise, by projecting a shadow, the measurements may be derived based on illumination and resulting shadows. Accordingly, by positioning the shadow across the measurement area, then placing two cursors as close as possible to the shadow at furthermost points of a desired measurement may result in the derivation of the distance between the points. Placing the shadow across the measurement area, and then placing cursors at edges (e.g., illuminated edges) of the desired measurement area approximately to the center of a horizontal shadow may result in a skew measurement, otherwise defined as a linear (point-to-point) measurement on a surface that is not perpendicular to the probe 14 view. This may be useful when a vertical shadow is not obtainable.

Similarly, positioning a shadow across the measurement area, and then placing one cursor on a raised surface and a second cursor on a recessed surface may result in the derivation of depth, or a distance between a surface and a point above or below the surface. Positioning the shadow near the measurement area, and then placing a circle (e.g., circle cursor of user selectable diameter, also referred to as circle gauge) close to the shadow and over a defect may then derive the approximate diameter, circumference, and/or area of the defect.

Overlay data 168 may also include annotation data. For example, text and graphics (e.g. arrow pointers, crosses, geometric shapes) may be overlaid on top of an image to annotate certain features, such as "surface crack." Additionally, audio may be captured by the NDT inspection device 12, and provided as an audio overlay. For example, a voice annotation, sounds of the equipment undergoing inspection, and so on, may be overlaid on an image or video as audio. The overlay data 168 received by the mobile device 22 and/or cloud 24 may then be rendered by a variety of techniques. For example, HTML5 or other markup languages may be used to display the overlay data 168. In one embodiment, the mobile device 22 and/or cloud 24 may provide for a first user interface different from a second user interface provided by the NDT device 12. Accordingly, the overlay data 168 may be simplified and only send basic information. For example, in the case of the tip map, the overlay data 168 may simply include X and Y data correlative to the location of the tip, and the first user interface may then use the X and Y data to visually display the tip on a grid.

Additionally sensor data 174 may be communicated. For example, data from the sensors 126, 140, and x-ray sensor data, eddy current sensor data, and the like may be communicated. In certain embodiments, the sensor data 174 may be synchronized with the overlay data 168, for example, overlay tip maps may be displayed alongside with temperature information, pressure information, flow information, clearance, and so on. Likewise, the sensor data 174 may be displayed alongside the image or video data 170.

In certain embodiments, force feedback or haptic feedback data 176 may be communicated. The force feedback data 176 may include, for example, data related to the borescope 14 tip 136 abutting or contacting against a structure, vibrations felt by the tip 136 or vibration sensors 126, force related to flows, temperatures, clearances, pressures, and the like. The mobile device 22 may include, for example, a tactile layer having fluid-filled microchannels, which, based on the force feedback data 176, may alter fluid pressure and/or redirect fluid in response. Indeed, the techniques describe herein, may provide for responses actuated by the mobile device 22 suitable for representing sensor data 174 and other data in the conduit 162 as tactile forces.

The NDT devices 12 may additionally communicate position data 178. For example, the position data 178 may include locations of the NDT devices 12 in relation to equipment 18, 104, and/or facilities 20, 106. For example, techniques such as indoor GPS, RFID, triangulation (e.g., WiFi triangulation, radio triangulation) may be used to determine the position 178 of the devices 12. Object data 180 may include data related to the object under inspection. For example, the object data 180 may include identifying information (e.g., serial numbers), observations on equipment condition, annotations (textual annotations, voice annotations), and so on. Other types of data 182 may be used, including but not limited to menu-driven inspection data, which when used, provides a set of pre-defined "tags" that can be applied as text annotations and metadata. These tags may include location information (e.g., $1^{st}$ stage HP compressor) or indications (e.g., foreign object damage) related to the object undergoing inspection. Other data 182 may additionally include remote file system data, in which the mobile device 22 may view and manipulate files and file constructs (e.g., folders, subfolders) of data located in the memory 25 of the NDT inspection device 12. Accordingly, files may be transferred to the mobile device 22 and cloud 24, edited and transferred back into the memory 25. By communicating the data 164-182 to the mobile device 22 and the cloud 24, the techniques described herein may enable a faster and more efficient process 150.

Inspection Management

It may be beneficial to provide an overview of inspection data, such that inspection management may be more conveniently implemented. For example, in some embodiments, inspection management graphical user interfaces may present inspection information in a manner that expedites scheduling of new inspection based upon inspector availability, asset outages, inspection equipment availability, etc. By enabling these graphical user interfaces, inspection managers may be apprised of additional information that has traditionally been difficult to obtain.

Figure 7:
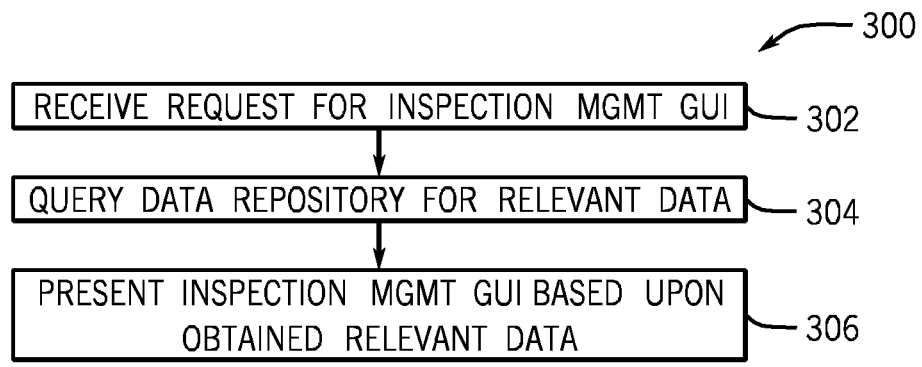
FIG. 7 is a flowchart illustrating a process for providing real-time inspection management data in a graphical user interface, in accordance with an embodiment.

FIG. 7 is a flowchart illustrating a process 300 for providing real-time inspection management data in a graphical user interface, in accordance with an embodiment. The process 300 begins by receiving a request for an inspection management graphical user interface (block 302). For instance, an inspector or other operation may desire to: view the inspector's scheduled inspections, view planned asset outages, view information relating to inspection device availability, start a remote collaboration session with an inspector at a local inspection site, view site inspection status, etc. The inspector may request a GUI providing the desired information via a computer by accessing an appliccation, website, etc.

A data repository may be accessed and queried for relevant inspection data pertaining to the request described in block 302 (block 304). Data in the data repository may be provided by a data-provider, such as a cloud-based data provider, that is communicatively coupled to the computer and/or other device (such as an inspection instrument) providing the GUI. In some embodiments, the data repository may store inspection management data, such as: historical inspection data, inspection schedules for a given asset that will be inspected, inspection schedules for particular inspectors, asset location, inspector location, etc. For example, an inspector may provide data to the data-provider via an inspection instrument, such as inspection status, inspection results, etc. Subsequently, the computer or other device may obtain the data from the data-provider. Using the provided inspection data, the computer or other device may provide an inspection management GUI (block 306), enabling an operator to efficiently manage numerous inspections across a multitude of geographies.

Figure 8:
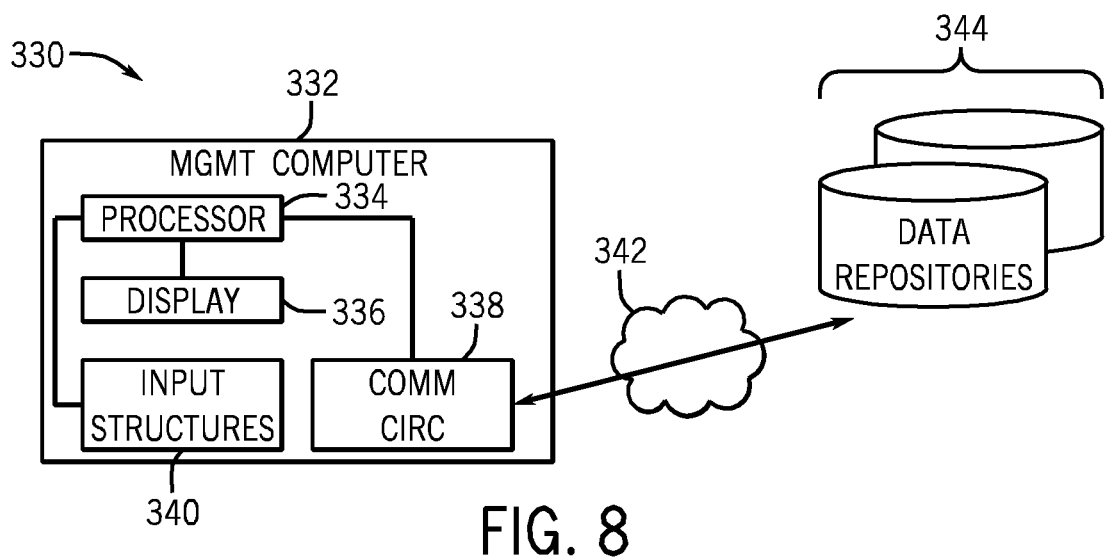
FIG. 8 is a schematic diagram of a inspection management system, in accordance with an embodiment.

FIG. 8 is a schematic diagram of an inspection management system 330 enabled to provide an inspection management GUI, in accordance with an embodiment. The inspection management system 330 may include a management computer 332 or other device, such as an inspection instrument, that includes a processor 334, a display 336, communications circuitry 338 and/or input structures 340. The processor 334 may detect a desire to present an inspection management GUI to facilitate inspection management. For example, the processor 334 may interpret such a desire based upon an operator's interaction with the input structures 340. Based upon the determined request, the processor 334 may provide a data request to a data provider (e.g., cloud-based data provider 342). The data provider may access one or more data repositories 344 to obtain particular inspection data useful for populating the inspection management GUI. The data repositories 344 may include, for example, data from a manufacturer of the inspection device and/or inspected asset, historical inspection data provided from previous inspections, inspection scheduling data, and/or inspection status data. For instance, this data may be provided by devices the inspection environment to the data repositories 344. For example, an inspection instrument may provide inspection status updates to the data repositories 344 as an inspection progresses. Upon receiving the inspection data from the data provider, the management computer 332 or other device may present the GUI via the display 336 or other human machine interface, such as a simulated display device served up in a web browser, computer application, and/or inspection device interface. In some instances, the GUI may present the data from data repositories 344 in real-time.

Figure 9:
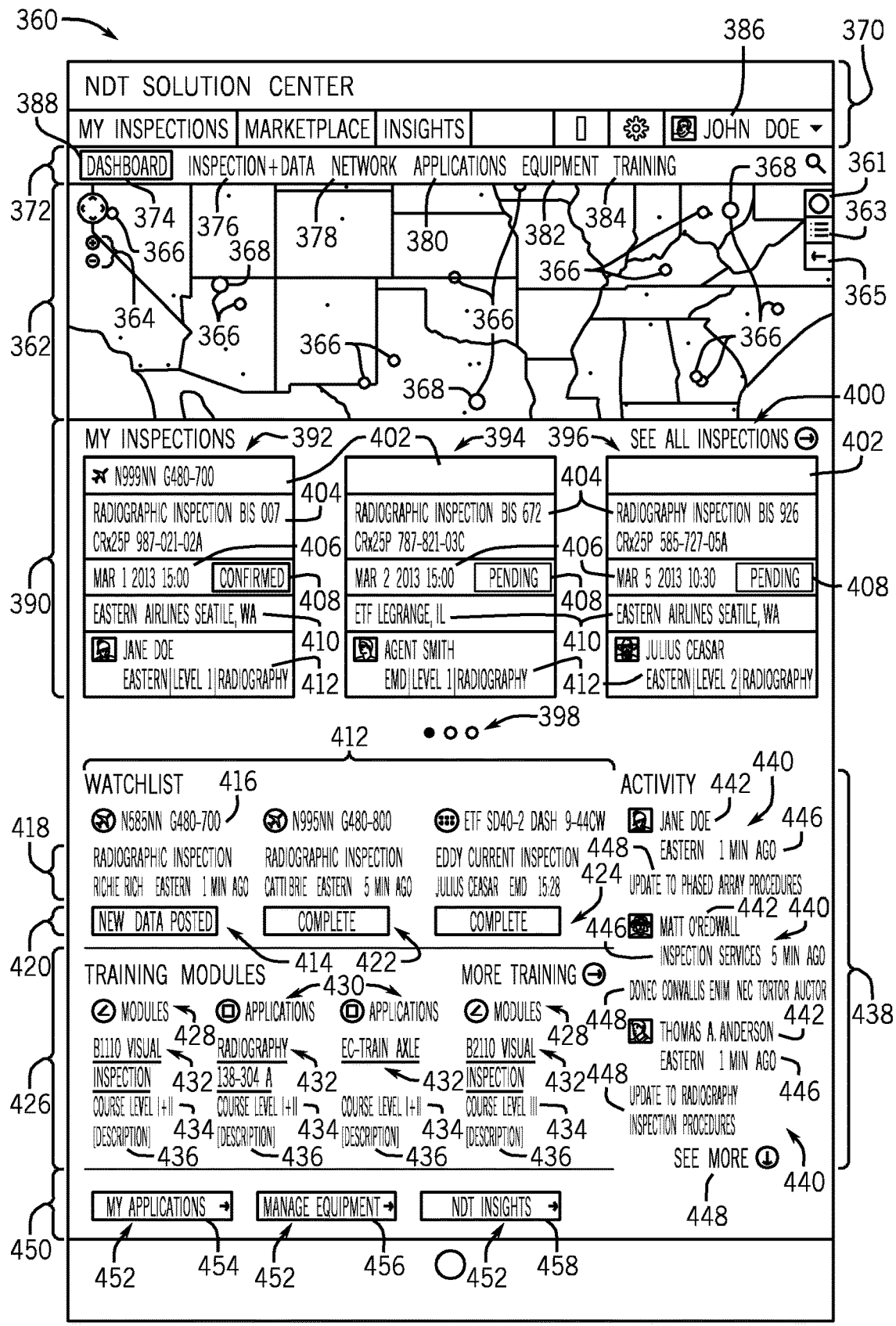
FIG. 9 is an example of an inspection management system graphical user interface (GUI), in accordance with an embodiment.

Having now discussed features of an inspection management computer that may present the inspection management graphical user interface, the discussion now turns to particular graphical user interfaces useful in managing inspections. FIG. 9 is an example of an inspection management system graphical user interface (GUI) 360 useful for managing the inspection of assets across multiple geographies, in accordance with an embodiment. When the atlas view icon 361 is selected, the GUI 360 includes an atlas view, providing a geographical representation of inspection data using a digitized map 362. The GUI 360 is not limited to an atlas view. When the list icon 363 is selected, a listing of inspection data is provided. However, in the current view, the atlas icon 361 is selected. The digitized map 362 illustrates a country-level view (e.g., the United States of America). However, in some embodiments, the scope of the digitized map 362 may change. For example, in the provided embodiment, zoom buttons 364 may modify the scope of the map 362. When the zoom is increased, the scope may be reduced (e.g., to a portion of the country-level view). When the zoom is decreased, the scope may increase (e.g., to a multi-country view and/or a global view). By enabling a dynamic scope adjustment within the GUI 360, an inspector may specify a particular region of inspection management that is desired by the inspector. The map 362 may include inspection data icons 366, which may provide an indication of certain inspection data at a particular geography. For example, the placement of the data icons 366 may represent a location of an inspection asset, inspection instrument, inspector, etc. The icons 366 may vary to illustrate a variety of characteristics of the inspection data. For example, the icons 366 may vary in color, size, transparency, etc. Further, as illustrated, one variance of the icons 366 may be to present a border 368 around the icons 366, further indicating a particular attribute of the inspection data. In some embodiments, one icon 366 variation (e.g., a color variation, size variation and/or border variation) may indicate an asset type. For example, gas turbines might be represented in one size icon 366 and airplanes may be represented in a differently sized icon 366. Further, a variation in the icons 366 may signify other differences regarding the assets (e.g., icons 366 representing Manufacturer A's airplanes may be sized differently than icons 366 for Manufacturer B's airplanes). Icon 366 variance may also represent a change in asset status (e.g., online or offline), inspection status (e.g., emergency inspection, scheduled inspection, inspection in progress, recently completed inspection, etc.) and/or inspection instrument type (e.g., borescope, eddy current, X-ray). Further, one or more of these variations may represent personnel-related information. For example, Inspector A's inspections may be represented in blue and Inspector B's inspections may be represented in red. Further, different icon 366 borders 368 may be used to signify that a particular inspector certification and/or certification level is needed to complete an inspection. By using icon 366 variances in a geographical view, an inspection planning team may quickly and accurately assess the inspection environment. Accordingly, the planning team may observe various inspection environment attributes, such as outages, inspection equipment availability, inspector availability, inspection status, etc., and make any inspection planning changes accordingly.

Depending on the view selected in the GUI 360, the icons 366 and the variances of the icons 366 may indicate different inspection data and inspection data characteristics. In some embodiments, the GUI 360 may include a toolbar 370 with a view selector 372 that enables an operator to select one of many views for the GUI 360, each with icons 366 representing different inspection data and/or inspection data attributes. In alternative embodiments, such as embodiments where the GUI 360 is provided in a display with a more limiting screen size (e.g., a display of an inspection instrument), only one or a subset of the many views may be available. In the current embodiment, the views include: a dashboard view 374, an inspections and data view 376, a network view 378, an applications view 380, an equipment view 382, and a training view 384. These views may provide particular inspection data related to a particular selected item. For instance, in the current example, the GUI 360 is focused on data for a supervisor "Edward Turner," as indicated by the item selector 386. By selecting an item in the item selector 386, the operator may choose a particular item (e.g., an inspector, operator, asset, location, time interval, and/or geography) with which to obtain inspection data for. Because the item selector 386 is set to supervisor "Edward Turner" in the current example, inspection data associated with "Edward Turner" will be presented in the GUI 360. The dashboard view 374 may provide an overview of inspection data. The inspections and data view 376 may provide a listing of performed inspections and the collected data obtained during those inspections. The network view 378 may provide network statistics. The applications view 380 may provide a list of available applications associated with the selected item. The equipment view 382 may provide details regarding the inspection devices and/or the assets that undergo inspection associated with a selected item. The training view 384 may provide training modules associated with a selected item.

As indicated by the highlighted icon 388, the current view is the dashboard view 374. The dashboard view 374 may provide an overview of inspection data available for the item selected in the item selector 386. For instance, in the current example, an overview of inspection data for "Edward Turner" is provided. In some embodiments, an assigned inspection section 390, which may provide details about upcoming inspections assigned to "Edward Turner." In the current example, the assigned inspection section 390 provides separate inspection boxes 392, 394, and 396 for the top 3 inspections assigned to the supervisor. Additional assigned inspections may be displayed by selection one of the additional information icons 398 or the "See All Inspections"

option 400. This section is not limited to showing the top 3 inspections, but indeed, in alternative embodiments may show any number of top items or a listing of all assigned inspections. Further, in some embodiments, a grid or other display method may be used in lieu of the inspection boxes 392, 394, and 396. The provided example is not intended to limit the design, but instead is provided to facilitate discussion of the GUI 360.

The assigned inspection section 390 may provide details regarding the assigned inspections. For example inspection boxes 392, 394, and 396 each provide an identity 402 of the asset to be inspected, particular inspection devices to be used in the inspection 404, a date and/or time planned for the inspection 406, the scheduling status 408, a location of the inspection 410, and identifying information for other resources associated with the inspection (e.g., an assigned inspector 412).

In an embodiment of the GUI 360 provided on an inspection instrument, for instance, inspection tasks assigned to inspector and/or inspection instrument may be provided. For example, as described above, one or more maps (e.g., geographical and/or site-baed) and/or overlays may provide asset location information for one or more assets scheduled to be inspected (or previously inspected) by the inspector and/or inspection instrument. Accordingly, the inspector may stay apprised of assigned inspection tasks, which may, for example, be assigned remotely by an inspection planning team. The maps and/or overlays may guide the inspector from the current location to a location of the next planned inspection. Accordingly, the inspector may efficiently move between inspections, being provided guidance along the way In some embodiments, the dashboard view 388 may also include a watchlist section 412, which may provide an operator with particular actions assigned to the operator, based upon, for example, inspection data changes. For example, a supervisor may wish to remain apprised when new data is captured for an inspection the supervisor is assigned to, such that the operator may analyze the data. Accordingly, the watchlist section 412 may present a watchlist item 414 when new data is provided to a data repository. In the current embodiment, the watchlist item 414 includes an item identifier 416 (e.g., an inspection identifier for the inspection with a data change), characteristic data 418 relating to the item (e.g., the type of inspection, the inspector who performed the inspection, the location of the inspection, when the inspection was performed, etc.). The watchlist item 414 also includes a status indicator 420, which may provide an indication regarding why the item 414 is in the watchlist section 412 (e.g., because "new data posted"). Watchlist items 422 and 424 also include an item identifier 416, characteristic data 418, and a status indicator 420, both indicating that an inspection has been completed.

A training section 426 may also be included in the GUI 360. The training section 426 may include information regarding any training modules and/or applications associated with a selected item. For example, the provided training module items 428 and/or application items 430 are associated with modules and/or applications that "Edward Turner" may be interested in, such as training modules and/or applications appropriate for "Edward Turner" based upon course level, subject matter, scheduled inspections, etc. The training module items 428 and/or application items 430 may provide links 432 to download the actual modules and/or applications. Further, a course level 434 and summary 436 associated with these items may be provided.

Further, operators may desire to remain apprised of activity within the inspection environment, even when no inspection-related tasks are assigned to the operator regarding the activity. An activity section 438 may be provided in the GUI 360 to provide such information. The activity section 438 may provide activity items 440, representing inspection-related activities that are occurring in the inspection environment, as determined based upon data provided from the data repositories. The activity items 440 may include identifying information relating to the item performing the activity 442 (e.g., an operator and/or the operator's employer), where the activity took place 444, and/or when the activity took place 446. Further a description 448 of the activity may be provided. In the current embodiment, the three most recent activities are shown. Additional activities may be shown by selecting the "see more" option 448.

A function section 450 may also be provided. The function section 450 may provide options 452, facilitating inspection management. For example, in the current embodiment, the "My Applications" option 454 may present each of the downloaded applications associated with a currently logged-in user. The "Manage Equipment" option 456 may be used to present management options for assets and/or inspection devices associated with the user. In some embodiments, these options many include the ability to associate new equipment with a user. The "NDT Insights" option 458 may provide access to online analysis and reporting tools for NDT data.

Figure 10:
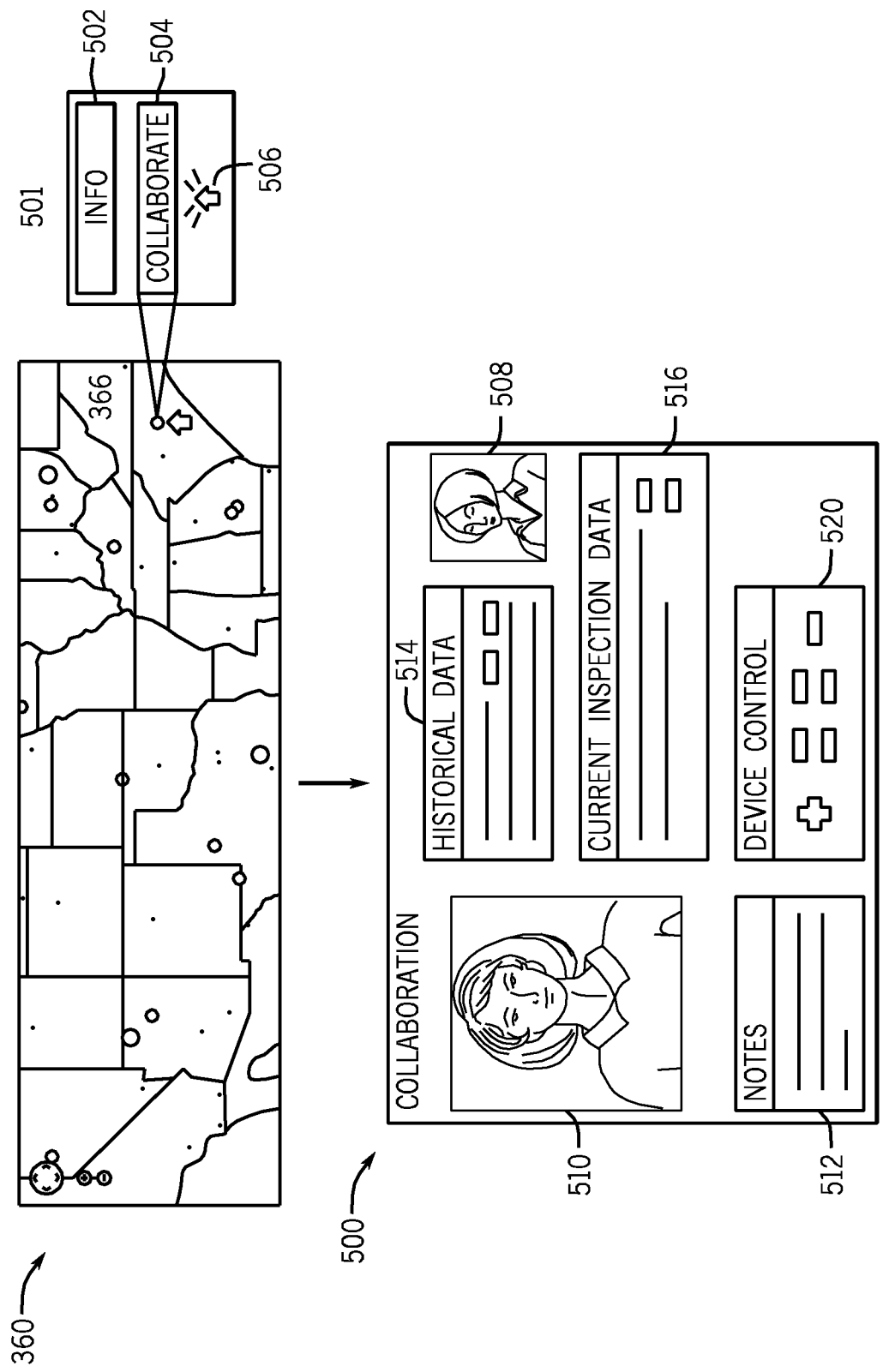
FIG. 10 is an example of a collaboration session GUI facilitated by an inspection management system, in accordance with an embodiment.

Remote collaboration between operators may also be facilitated using a GUI. FIG. 10 is an example of a collaboration session GUI 500 initiated from the GUI 360, in accordance with an embodiment. For example, when a user hovers over an icon 366 of the GUI 360, a menu 501 may be provided, detailing specific inspection data 502 relating to that icon 366. Further, a collaboration option 504 may be presented as an option when remote collaboration is possible (e.g., when an on-site inspector is equipped with inspection equipment enabled with remote collaboration capabilities). Upon selecting the collaboration option 504, as indicated by arrow icon 506, the GUI 500 is presented. The GUI 500 may include a self-view window 508, enabling an operator to see a self-representation (e.g., an avatar image or live video feed) provided to the remote inspector. Further, a video conferencing window 510 may provide a representation (e.g., an avatar image or live video feed) of the remote inspector. During the collaboration session facilitated by the GUI 500, the operator and remote inspector may initiate an audio and/or video conference, may share data with one another, may share control and/or access to inspection equipment, may provide a virtual representation of the inspection device in a remote location, etc. For instance, in the current example, the GUI 500 includes a notes section 512 that may be shared by the remote inspector to the operator. The notes section 512 may include text, images, audio, and/or video that the remote inspector has created. Further, the operator may annotate and/or create additional notes via user input structures coupled with the GUI 500. Further, in some embodiments, the GUI 500 may generate a virtual representation of the inspection device display output presented in the field. For example, as discussed above regarding FIG. 3, video 134 may be displayed in a screen 135 of the borescope 14. This video 134 (and any other information displayed in the screen 135) may be presented in the GUI 500, enabling a remote operator to observe the borescope 14 data.

Inspection data may also be presented in the GUI 500. For example, the collaboration session may be facilitated by enabling data review by both the remote inspector and the operator. Accordingly, a historical data section 514 may provide historical inspection data associated with the current collaboration topic, as specified by the remote inspector and/or the operator. Further, any current inspection data 516 relating to the current collaboration topic may also be presented in the GUI 500. The historical data 514 and the current inspection data 516 may include text, images, audio, and/or video.

Additionally, when the operator has proper access rights, a device control interface 520 may be provided. The device control interface 520 may enable an operator to remotely control inspection equipment. For example, the device control interface 520 may enable an operator to remotely calibrate an inspection equipment (e.g., borescope, eddy current, X-ray, ultrasound, etc.), collect information from the inspection equipment, control the inspection equipment, etc.

Figure 11:
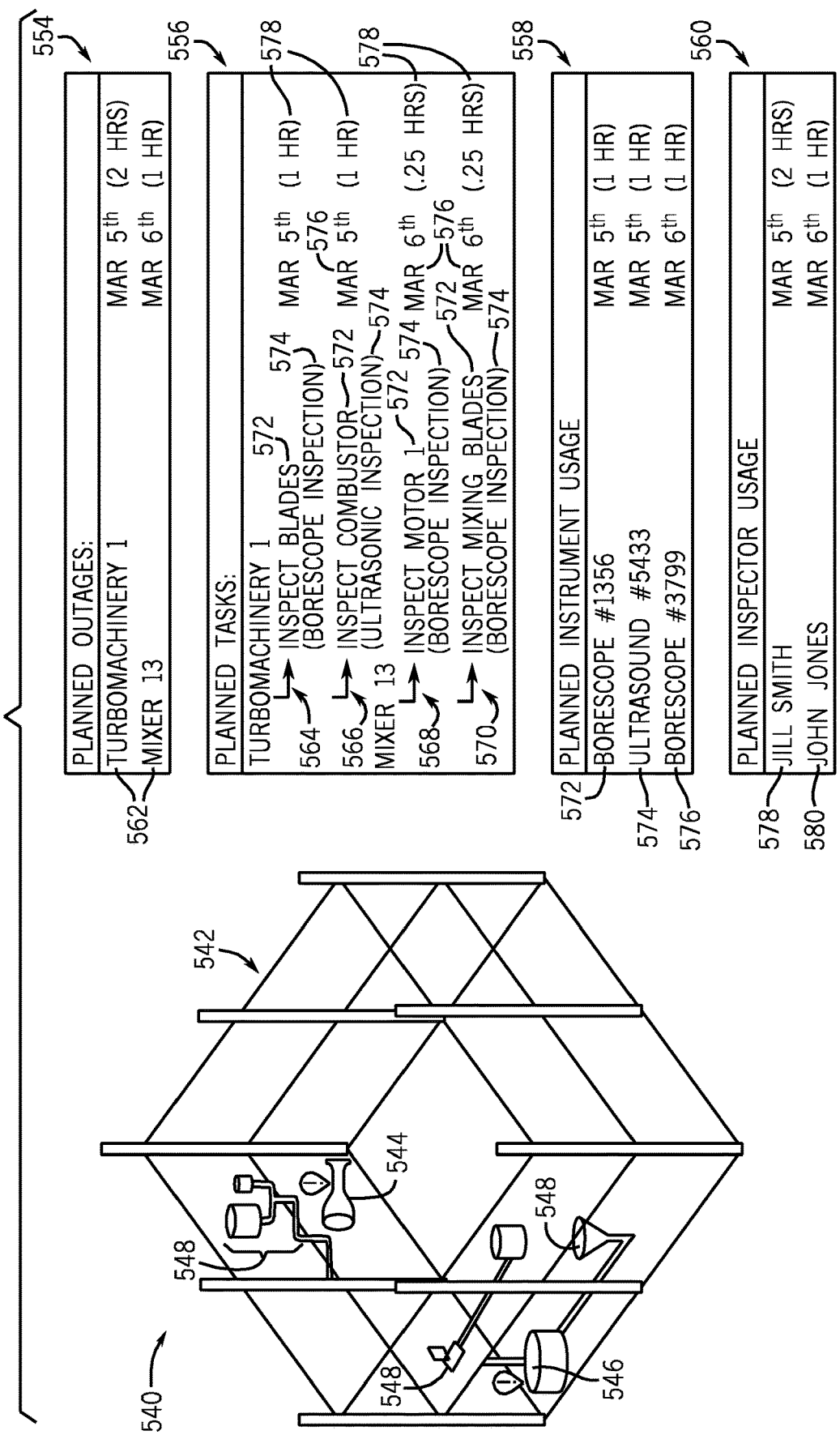
FIG. 11 is an alternative inspection management GUI, in accordance with an embodiment.

FIG. 11 is an alternative inspection management GUI 540, in accordance with an embodiment. As previously mentioned, the inspection management graphical user interfaces (e.g., GUI 540) may include a facility layout 542. In the current example, the facility layout 542 represents a view of a multi-floored plant with various assets placed throughout the plant. For example, the plant contains a piece of turbo-machinery, represented by the turbo-machinery icon 544. Further, a mixer is represented by the icon 546. Various other assets may be represented by one or more icons 548.

A variety of planned activities relating to inspection may be provided in the GUI 540. For example, planned asset outages may be provided in a planned outages section 554. Planned tasks (e.g., items to be completed on a particular asset or using a particular piece of inspection equipment) may be provided in a planned tasks section 556. Planned usage for inspection equipment may be provided in a planned equipment usage section 558 and planned inspector usage or other operator usage may be provided in a planned inspector or other operator usage section 560.

In the current example, inspections may be planned for turbo-machinery1 on March $5^{th}$ and Mixer 13 on March $6^{th}$. The inspections may be scheduled with durations of 2 hours and 1 hour, respectively. Accordingly, the planned outages section 554 may include planned outage notifications 562, providing notice of the planned outages and the planned outage durations based upon the inspection schedule.

The planned tasks section 556 may provide tasks that are planned for assets within the plant. For example, as previously mentioned, in the current example an inspection is planned for March $5^{th}$ on Turbo-machinery1. Accordingly, tasks associated with this inspection are populated in the planned tasks section 556. Specifically, a blade inspection task 564 and a combustor inspection task 566 is associated with Turbo-machinery1 in the planned tasks section 556. Further the tasks associated with the Mixer 13 inspection are populated in the planned tasks section 556. Specifically, a motor 1 inspection task 568 and a mixing blade inspection task 570 are associated with Mixer 13 in the planned tasks section 556. Each of the tasks 564, 566, 568, and 570 may include, for example, an identifier 572 that identifies the task, other details relating to the task 574 (e.g., the type of equipment needed for the inspection), a scheduled date for the inspection 576, and/or a planned duration for the task 578.

The planned inspection device usage section 558 may also be updated based upon the inspection schedule. For example, as illustrated by tasks 564 and 566, the turbo-machinery1 inspection on March $5^{th}$ may utilize a borescope and ultrasonic equipment, each for a duration of 1 hour. Accordingly, device items 572 and 574 provide notification of a particular borescope and ultrasound equipment that are planned to be used in the inspection, respectively. Further device item 576 provides notice of a particular borescope that will be used for the Mixer 13 inspection on March $6^{th}$. By providing the planned inspection device usage schedule, an operator may more conveniently discern available devices for additional inspections, and thus, may enable the operator to more efficiently schedule additional inspections based upon device availability.

The planned inspector (or other operator) usage section 560 may also provide convenience when planning inspections. This section 560 enables an operator to see which inspectors are available and/or unavailable for performing inspections. In the current example, Jill Smith is scheduled to conduct the turbo-machinery1 inspection on March $5^{th}$ and John Jones is scheduled to conduct the Mixer 13 inspection on March $6^{th}$. Accordingly inspector usage items 578 and 580 are populated in the planned inspector usage section 560. These items 578 and 580 may provide an inspection date and/or time as well as duration, thus enabling an operator (e.g., an inspection planner to more efficiently plan future inspections).

As may be appreciated, the inspection management graphical user interfaces may efficiently present inspection data to an inspection manager. Accordingly, the manager may make more-informed inspection management decisions, based upon resource availability, asset availability, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An inspection management system, comprising:
one or more processors configured to:
receive a user selection related to one or more assets subject to inspection;
provide a request for a subset of inspection data to an inspection data provider, the subset of the inspection data defined based upon the user selection;
obtain the subset of the inspection data provided from the inspection data provider, the subset of inspection data comprising historical inspection data, current inspection data, scheduled inspection data, a location of the one or more assets subject to inspection, or a combination thereof associated with the user selection; and
present, in real-time, an inspection management graphical user interface, the inspection management graphical user interface comprising a graphical rendering based upon the subset of the inspection data, wherein the graphical rendering comprises an assigned inspection section that provides details regarding assigned inspections that are assigned to an inspector identified based upon the user selection, a watchlist section that provides updates to data identified based upon the user selection, and a training section that provides training modules identified based upon the user selection;

wherein at least a portion of the subset of the inspection data is presented via the inspection management graphical user interface based upon the location of the one or more assets subject to inspection.

2. The inspection management system of claim 1, wherein the inspection management graphical user interface comprises a map and one or more icons, the icons being placed on the map in a placement indicating an inspection location of the subset of the inspection data.

3. The inspection management system of claim 2, wherein the map comprises a world location map with zoom capability.

4. The inspection management system of claim 1, wherein the map comprises a facility diagram comprising icons where the one or more assets subject to inspection are located within a facility location represented by a location in the facility diagram.

5. The inspection management system of claim 2, wherein characteristics of the one or more icons vary to denote characteristics of the inspection data, the inspector, one or more devices used to complete the inspection, the one or more assets associated with the inspection, or a combination thereof.

6. The inspection management system of claim 1, wherein the inspection management graphical user interface comprises an item selector configured to enable a user to select an input.

7. The inspection management system of claim 1, wherein the inspection data provider is configured to receive inspection status from one or more devices used to complete the inspection.

8. The inspection management system of claim 1, wherein the inspection management graphical user interface comprises:
   a scheduled inspection section providing information regarding scheduled inspections associated with the inspector and one or more devices used to complete inspections;
   one or more maps, or overlays detailing a path between a current location and a location of a next planned inspection.

9. The inspection management system of claim 1, wherein the watchlist section is associated with a specific item, and wherein the watchlist section is configured to present scheduled activities assigned to the user selection.

10. The inspection management system of claim 1, wherein the inspection management graphical user interface comprises:
    an activity section configured to present inspection-related activities that are occurring in an inspection environment.

11. A tangible, non-transitory, machine-readable medium, comprising machine-readable instructions that direct one or more processors to:
    receive a user selection related to one or more assets subject to inspection;
    provide a request for a subset of inspection data to an inspection data provider storing inspection data, wherein the subset of inspection data is defined based upon the user selection,
    receive the subset of inspection data from the inspection data provider, wherein the subset of inspection data comprises historical inspection data, current inspection data, scheduled inspection data, a location of the one or more assets subject to inspection, or a combination thereof associated with the user selection and comprises a location of the one or more assets subject to inspection; and
    present, in real-time, an inspection management graphical user interface comprising a graphical rendering based upon the subset of the inspection data, wherein the graphical rendering comprises:
       an assigned inspection section that provides details regarding assigned inspections that are specifically assigned to an inspector identified based upon the user selection;
       a watchlist section that provides updates to data identified based upon the user selection; and
       a training section that provides training modules identified based upon the user selection;
    present one or more icons in the inspection management graphical user interface; and
    present a menu at the one or more icons, wherein the menu comprises a collaboration option that is configured to initiate a remote collaboration session between a first operator using the inspection management graphical user interface and a second operator using a remote device;
    wherein at least a portion of the subset of the inspection data is presented via the inspection management graphical user interface based upon the location of the one or more assets subject to inspection of the subset of the inspection data.

12. The machine-readable medium of claim 11, comprising machine-readable instructions to:
    detect a hover over the one or more of the icons; and
    present the menu at the one or more icons where the hover is detected, wherein the menu comprises details of the inspection data represented by the one or more icons.

13. A method, comprising:
    receiving a user selection related to one or more assets subject to inspection;
    providing a request for a subset of inspection data to an inspection data provider storing inspection data, wherein the subset of the inspection data is defined based upon the user selection;
    receiving, via communications circuitry, the subset of inspection data from the inspection data provider, wherein the subset of inspection data comprises historical inspection data, current inspection data, scheduled inspection data, a location of the one or more assets subject to inspection, or a combination thereof associated with the user selection and comprises a location of the one or more assets subject to inspection; and
    presenting an inspection management graphical user interface, the inspection management graphical user interface comprising a graphical rendering based upon the subset of the inspection data, wherein the graphical rendering comprises:
       an assigned inspection section that provides details regarding assigned inspections that are specifically assigned to an inspector identified based upon the user selection;
       a watchlist section that provides updates to data identified based upon the user selection; and
       a training section that provides training modules identified based upon the user selection;
    wherein at least a portion of the subset of the inspection data is presented via the inspection management graphical user interface based upon the location of the one or more assets subject to inspection of the subset of the inspection data.

14. The method of claim 13, wherein presenting the inspection management graphical user interface comprises:
presenting a planned outage section; configured to provide notice of planned outages and planned outage durations based at least in part upon inspection scheduling data.

15. The method of claim 13, wherein presenting the inspection management graphical user interface comprises:
presenting a planned tasks section configured to provide notice of tasks that are planned within an inspection environment based at least in part upon inspection scheduling data;
presenting a planned equipment usage section configured to provide notification of a planned usage of inspection equipment based at least in part upon the inspection scheduling data;
presenting a planned inspector, or other operator usage section, configured to provide notification of a planned availability of an inspector, or other operator, based at least in part upon the inspection scheduling data.

* * * * *